S. Z. DE FERRANTI.
TURBINE DRIVEN AUTOMOTOR.
APPLICATION FILED JULY 18, 1910.
Reissued Mar. 14, 1911.
13,217.
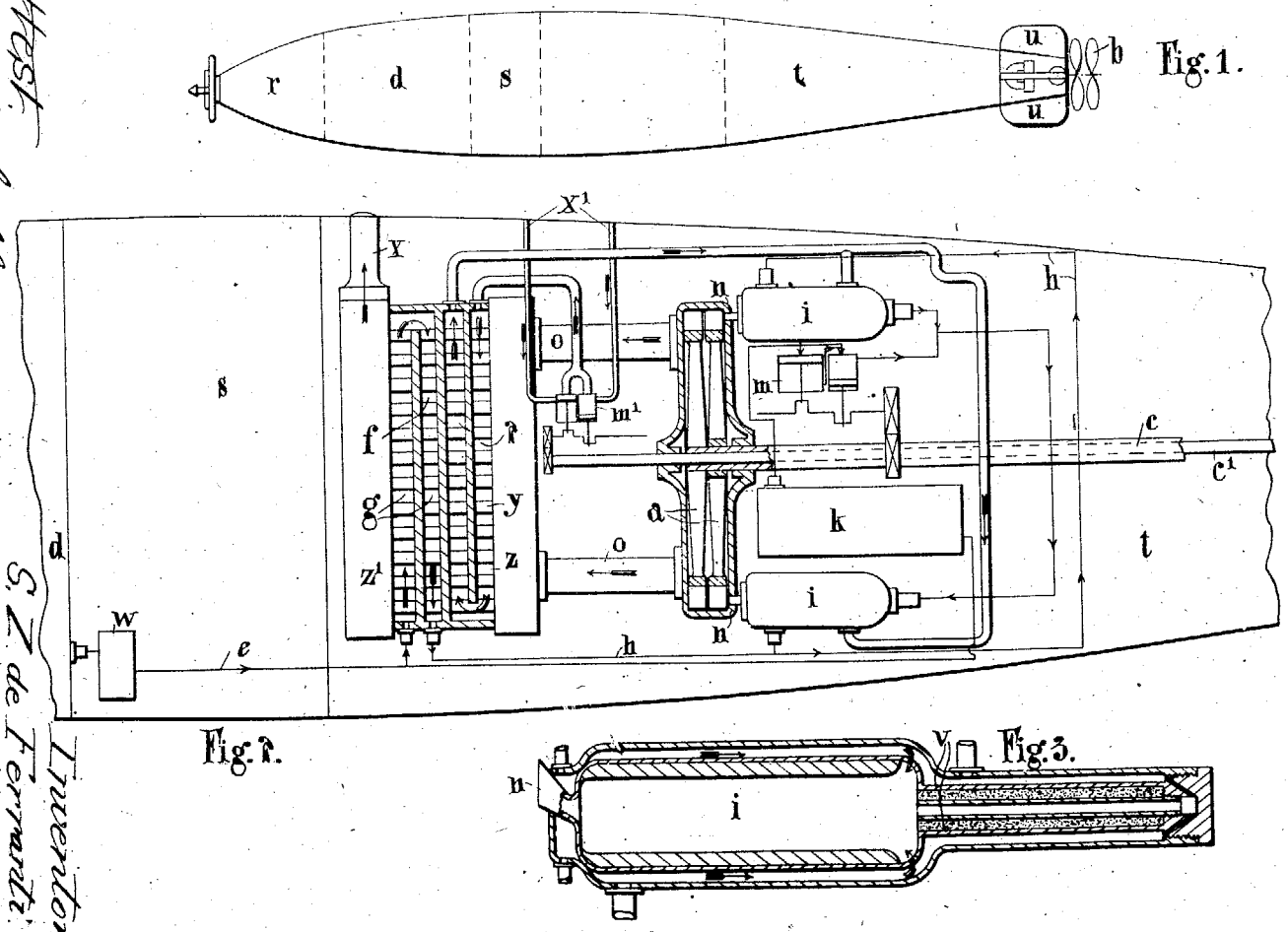
Inventor
S. Z. de Ferranti
by Spear, Middleton, Donaldson & Spear
Attys.
Attest.
Bert. W. Kahl.
Edward A. Sarton

UNITED STATES PATENT OFFICE.

SEBASTIAN ZIANI DE FERRANTI, OF GRINDLEFORD, NEAR SHEFFIELD, ENGLAND.

TURBINE-DRIVEN AUTOMOTOR.

13,217. Specification of Reissued Letters Patent. Reissued Mar. 14, 1911.

Original No. 925,889, dated June 22, 1909, Serial No. 256,107. Application for reissue filed July 18, 1910. Serial No. 572,646.

*To all whom it may concern:*

Be it known that I, SEBASTIAN ZIANI DE FERRANTI, a subject of the King of Great Britain and Ireland, and residing at Grindleford, near Sheffield, in the county of Derby, England, formerly of 31 Lyndhurst road, Hampstead, London, N. W., England, have invented certain new and useful Improvements in and Relating to Turbine-Driven Automotors, of which the following is a specification.

This invention has for its object to effect improvements in turbine installations so as to make them specially suitable to the propulsion of automotors such as torpedoes, where it is desired to have a simple plant working from stored energy not only contained in the combustible, but also in the form of compressed air, compressed gas, liquid air or gas, or a compound such as slow burning powders and the like, which are capable of giving off heat energy without the employment of oxygen derived from the external air.

The invention thus consists in a turbine installation adapted to utilize a given store of energy without the employment of oxygen other than that contained in said store in a more efficient manner than has heretofore been possible by any known means.

The invention further consists in certain adjuncts necessary for working the above installation to the best advantage.

Referring to the accompanying drawings which form part of my specification, Figure 1 is a longitudinal elevation of a Whitehead torpedo driven in accordance with the present invention. Fig. 2 being a section through the engine room to an enlarged scale. Fig. 3 shows a detail of a combustion chamber in which the air is heated by a slow burning powder or the like.

I wish it to be understood that the drawings accompanying this specification are of a diagrammatic nature throughout and are not to be taken as working drawings.

Where desirable corresponding elements in the different figures are denoted by the same reference symbols.

According to one form of my invention, I construct torpedoes of the Whitehead type and instead of fitting them with engines as at present, I supply the motive power by means of a multiple impact turbine having two oppositely running wheels, *a*, Fig. 2, of any known type, which drive screws, *b*, in opposite directions on two concentric shafts, *c*, *c'*. Instead of feeding these turbines with working fluid in the shape of cold air derived from the storage of compressed air as is common practice, I first lead the air or other gaseous oxidizing agent from a storage, *d*, by way of the pipe, *e*, to the chamber, *g*, of the regenerator, *f*, through which it passes and receives heat from the exhaust from the turbine; thence suitable pipes, *h*, lead to the combustion chambers, *i*, in which the oxidizing agent is raised to a high temperature such as 1200° C., or thereabout by burning in it a small amount of oil or like fuel, for example stored in a reservoir, *k*, the fuel being fed by means of a pump, *m*, driven by the propeller shaft, *c*, into the combustion chamber, *i*, in the form of finely divided spray. The action of the pump may be assisted by feeding the oil to it under pressure derived from the oxidizing agent so as to assist the positive action of the valves and therefore to give an accurate quantity of combustible; to carry this method into effect it is merely necessary to adapt the oil reservoir to withstand high pressures and to lead a pipe from the store, *d*, to the upper part of the reservoir, *k*. As an alternative the pump, *m*, may be dispensed with and the oil forced into the combustion chamber entirely by the pressure of the oxidizing agent. In either case only sufficient oil is delivered to raise the temperature of the working fluid to a point, such that after complete expansion it will not act detrimentally upon the running blades of the turbine. The working fluid issuing from the combustion chamber at a high temperature and pressure enters divergent expansion nozzles, *n*, which reduce its pressure from that of the combustion chamber down to a pressure a little above that of the atmosphere and its temperature to about 400° C. During its passage through the expansion nozzles the pressure energy of the working fluid is converted into velocity energy and the jets issuing from the nozzles, *n*, then impinge upon the blades of the turbine wheels, the power absorbed thereby being transmitted to the screws, *b*, by the shafts, *c*, *c'*. The exhaust from the turbine passes through the ducts, *o*, to the chamber, *z*, thence through the cross pipes, *y*, of the regenerator, *f*, to the chamber *z'*, from which it passes to the immersing medium through the duct, *x*. The oxidizing agent is thus heated on its passage from the extra high pressure chamber, *d*, to the combustion chambers, *i*. Between the chambers, *d*, and the turbine, a reducing valve, *w*, and control gear such as are usually employed at the present time in Whitehead torpedoes may be fitted; other usual parts of this type of torpedo such as the explosive head, *r*, balance chamber, *s*, buoyancy chamber, *t*, and horizontal and vertical rudders, *u*, are indicated in Fig. 1. It will be seen that on account of the greatly increased efficiency of the arrangement above described over those now in use, I am enabled to considerably reduce the volume of the storage chamber, *d*. Thus by the means described the compressed oxidizing agent is used on a highly advantageous cycle whereby about four times the horse-power-hours may be obtained in relation to using the air cold, the fact of having air or another oxidizing agent under pressure being taken advantage of for this purpose to give an internal combustion turbine of high efficiency.

In some cases I prefer to increase the bulk of the working fluid as well as reduce the temperature thereof by introducing water or water vapor into the combustion chambers and in Fig. 2 an arrangement is shown for effecting this result. A pump, *m'*, is connected through suitable valves in the ducts, *x'*, with the liquid in which the torpedo is immersed and forces water through the chamber, 2, of the regenerator *f*, to the combustion chambers, *i*, the oxidizing agent being led through the chamber, *g*, as before described. The water is forced through the regenerator at a pressure preferably above that of the working pressure of the combustion chambers so that on being discharged therein by means of spraying nozzles it is intimately mixed with the high temperature gases of combustion and completely evaporated. This latter arrangement is especially applicable when working with an oxidizing agent which gives a very high temperature of combustion such as oxygen, as the introduction of water or other medium of an inert nature as regards combustion is thereby rendered imperative in order that the temperature of the working fluid may be sufficiently reduced after passing through the expansion nozzles to prevent damage to the turbine blades and other materials of construction.

The proportion of fuel and air may be varied to suit varying sets of conditions as in some cases when working for example with air and fuel I may introduce sufficient air into the combustion chamber for the complete combustion of the fuel while in other cases I may arrange to have the air in excess, so as to obtain a lower temperature of the working fluid. When an inert medium is introduced into the combustion chambers such as water, I arrange the proportions of fuel and air or other oxidizing agent so as to completely evaporate the fluid introduced into the combustion chamber from the regenerator.

I wish it to be understood that I do not confine my invention to the use of any particular fuel as various kinds of fuel can be used without departing from the scope of my invention, *e. g.*, coal gas, enriched water gas, acetylene, acetylene dissolved in acetone. Moreover the oxidizing agent may be in any suitable state of aggregation as air or oxygen in the liquid or compressed gaseous state, the modification of my invention corresponding to any selected class being easily made by persons skilled in the art. In those cases where either the combustible element is in the liquid state and the oxidizing element is in the gaseous state under pressure or vice versa the pressure of the gaseous element may be utilized to force the liquid element into the combustion chamber either by mixing the elements or otherwise and if any of the elements used are liquefied gases it is advisable that evaporation thereof should be prevented as far as possible by allowing the vapor therefrom to circulate through jackets surrounding the vessel containing the liquefied gas.

According to another arrangement I may supply the heat to the compressed oxidizing agent by means of a slow burning powder and I can do this (see Fig. 3) by putting a charge of slow powder or like material, which may or may not contain a predetermined amount of water, into a tube or case, *v*, such as that containing a rocket, but of sufficient strength to resist the full pressure of the cycle. The end of this tube adjoins or projects into the heating chamber the hot gases from it mixing with oxidizing agent flowing in from the jacket, as indicated by the arrows and heating it to the desired temperature. The mixture is then expanded in the nozzle and dealt with as above explained.

According to another arrangement I may supply heat energy from a slow burning powder or material which contains its own elements of combustion and an inert body in the form of water pumped through or around the chamber containing the slow burning powder or the like, so as to prevent any undue rise of temperature by transmission from the burning material. Where the slow burning material can be supplied in the form of liquid, I prefer to mix the water with this and spray into the combustion chamber so as to get the most intimate possible mixture of the burning gases with the water, so as to obtain complete evaporation.

It will thus be seen that the essentials of the present invention consist in means for storing and bringing together substances or bodies which unite chemically with a development of heat or in other words exothermically interacting bodies and utilizing the products of such interaction combined with an inert substance, as the working fluid of a turbine driving an underwater automotor.

It is obvious that modifications of the above class of operations may be introduced, and I do not confine myself to the exact arrangements which I have described herein. What, however, is common to all these methods is an immensely better use of the store of energy carried than is practicable according to present methods, the turbine being specially useful in the form which I have described for taking advantage of the high temperatures which would be unworkable in an ordinary engine, as it is able to convert these temperatures into velocity and so work with moderate temperatures on the moving parts.

Having now described my invention what I claim as new and desire to secure by Letters Patent is:—

1. The combination in an under water automotor of a driving motor; receptacle means for certain constituents of the working fluid of said motor; means for introducing fluid from the immersing medium to augment the volume of said working fluid together with means for absorbing heat from the exhaust of said motor.

2. The combination in a torpedo of the locomotive type provided with suitable running gear including propelling and steering apparatus of a motor of the internal combustion type; means for transmitting the power developed by said motor to said propelling apparatus; receptacle means for fuel and an oxidizing agent; means for introducing fluid from the immersing medium to augment the volume of working fluid obtained by the combustion of said fuel and said oxidizing agent together with means for absorbing heat from the exhaust from said motor.

3. The combination with a torpedo of the locomotive type provided with suitable running gear including propelling and steering apparatus of a turbine of the internal combustion type; means for transmitting the power developed by said turbine to said propelling apparatus; receptacle means for fuel and an oxidizing agent; means for introducing fluid from the immersing medium to augment the volume of working fluid obtained by the combustion of said fuel and said oxidizing agent together with means for absorbing heat from the exhaust from said turbine.

4. The combination with a torpedo of the locomotive type provided with suitable running gear including propelling and steering apparatus of a motor of the internal combustion type comprising co-axial independently rotating turbine elements, co-axial power shaft means connecting said elements to said propelling apparatus; receptacle means for fuel and an oxidizing agent together with means for introducing fluid from the immersing medium to augment the volume of working fluid obtained by the combustion of said fuel and said oxidizing agent.

5. The combination with a torpedo of the locomotive type provided with suitable running gear including propelling and steering apparatus, of a motor of the internal combustion type comprising co-axial oppositely running turbine elements; co-axial power shaft means connecting said elements to said propelling apparatus; a suitable receptacle for fuel; a vessel having certain of its containing walls connected to the shell of said torpedo for the storage of an oxidizing agent together with means for introducing fluid from the immersing medium to augment the volume of working fluid obtained by the combustion of said fuel and said oxidizing agent.

6. The combination with a torpedo of the locomotive type provided with suitable running gear including propelling and steering apparatus, of a turbine of the internal combustion type, comprising oppositely running bladed turbine elements power shaft means connecting said turbine to said propelling apparatus, a suitable receptacle for the fuel, a vessel having certain of its containing walls connected to the shell of said torpedo for the storage of an oxidizing agent, a combustion chamber external to said vessel and means for introducing thereinto said fuel and said oxidizing agent, together with a duct from said combustion chamber through the shell of said torpedo for the introduction of fluid from the immersing medium.

7. The combination with a torpedo of the locomotive type provided with suitable running gear including propelling and steering apparatus, of a turbine of the internal combustion type comprising oppositely running bladed turbine elements, power shaft means connecting said turbine to said propelling apparatus, a suitable receptacle for the fuel, a vessel having certain of its containing walls connected to the shell of said torpedo for the storage of an oxidizing agent, a combustion chamber external to said vessel and means for introducing thereinto said fuel and said oxidizing agent, an exhaust duct from said turbine through the shell of said torpedo, a regenerator disposed in said duct together with means for passing said oxidizing means through said regenerator on its way to said combustion chamber.

8. The combination with a torpedo of the locomotive type provided with suitable running gear including propelling and steering apparatus, of a turbine of the internal combustion type, comprising oppositely running bladed turbine elements, power shaft means connecting said turbine to said propelling apparatus, a suitable receptacle for the fuel, a vessel having certain of its containing walls connected to the shell of said torpedo for the storage of an oxidizing agent, a combustion chamber external to said vessel and means for introducing thereinto said fuel and said oxidizing agent, an exhaust duct from said turbine through the shell of said torpedo, a regenerator disposed in said duct together with means for passing fluid from the immersing medium through said regenerator said passing means including a duct through the shell of said torpedo.

9. The combination with a torpedo of the locomotive type provided with suitable running gear including propelling and steering apparatus of a turbine of the internal combustion type, comprising oppositely running bladed turbine elements, power shaft means connecting said turbine to said propelling apparatus, a suitable receptacle for the fuel, a vessel having certain of its containing walls connected to the shell of said torpedo for the storage of a gaseous oxidizing agent under pressure, a combustion chamber external to said vessel and means for introducing thereinto said fuel and said oxidizing agent together with fluid from the immersing medium, said introducing means including means for reducing the pressure of said oxidizing agent.

10. The combination with a torpedo of the locomotive type provided with suitable running gear including propelling and steering apparatus, of a turbine of the internal combustion type, comprising oppositely running bladed turbine elements, power shaft means connecting said turbine to said propelling apparatus means for absorbing heat from the exhaust gases of said turbine together with a suitable receptacle for the fuel and a vessel built into the structure of the torpedo for the storage of air.

11. The combination with a torpedo of the locomotive type provided with suitable running gear including propelling and steering apparatus, of a turbine of the internal combustion type comprising one or more bladed turbine elements; means for transmitting the power developed by said turbine to the propelling apparatus, receptacle means for fuel and an oxidizing agent, expansion nozzles for conducting the gases generated by the combustion of said fuel and oxidizing agent to said turbine together with means for absorbing heat from the exhaust gases to said turbine.

12. The combination with a torpedo of the locomotive type provided with suitable running gear including propelling and steering apparatus, of a turbine of the internal combustion type having bladed elements, a receptacle for fuel, a receptacle for an oxidizing agent, a combustion chamber external to said oxidizing agent receptacle, expansion nozzles conducting the hot gases from said combustion chamber to said bladed elements, and a regenerator for recovering heat from the exhaust gases.

13. An automotor comprising in combination propelling means, a multi-stage velocity-compounded turbine operatively connected to said propelling means; a single stage expansion nozzle supplying working fluid to said turbine; a high pressure combustion chamber connected to said nozzle; means for storing exothermically reacting bodies, and connections from said storing means to said combustion chamber, together with means for also supplying to said combustion chamber a volume of make-up working fluid to be highly heated by the products of reaction of said exothermically reacting bodies.

14. An automobile torpedo comprising in combination propelling means, a multi-stage velocity-compounded turbine operatively connected to said propelling means; a single stage expansion nozzle supplying working fluid to said turbine; a high pressure combustion chamber connected to said nozzle; means for storing exothermically reacting bodies, and connections from said storing means to said combustion chamber, together with means for also supplying to said combustion chamber a volume of make-up working fluid to be highly heated by the products of reaction of said exothermically reacting bodies.

15. An automotor comprising in combination propelling means; a multi-stage velocity-compounded turbine operatively connected to said propelling means; a single-stage expansion nozzle supplying working fluid to said turbine; a high-pressure combustion chamber connected to said nozzle; a receptacle for fuel and a source of compressed oxidizer therefor; means for connecting said receptacle and said source to said combustion chamber; and means for introducing into said chamber a volume of make-up working fluid to be highly heated by the products of the oxidation of said fuel.

16. An automotor comprising in combination suitable running gear including means for propelling and steering; a receptacle for fuel and an oxidizer therefor; a combustion chamber, an expansion nozzle issuing therefrom; a turbine receiving the gases from said nozzle and driving said propelling means and means for heating a certain proportion of the working fluid by means of exhaust gases from said turbine.

17. An automotor, comprising in combination oppositely rotating propellers on coaxial shafts; separate turbine wheels driving said shafts respectively and a common combustion chamber supplying working fluid to both said turbine wheels.

18. An automotor comprising in combination suitable running gear including means for propelling and steering; storage means for exothermically interacting bodies; means for conducting said bodies to the reaction spot; means for admixing with the products of said reaction a certain volume of fluid inert with regard thereto; a turbine utilizing such admixture as working fluid and means for transmitting power developed by said tubine to said propelling means.

19. An underwater automotor comprising in combination suitable running gear including means for propelling and steering; storage means for exothermically interacting bodies; means for conducting said bodies to the reaction spot; means for admixing with the products of said reaction a certain volume of fluid from the immersing medium; a turbine utilizing such admixture as working fluid and means for transmitting power developed by said turbine to said propelling means.

20. An underwater automotor comprising in combination suitable running gear including means for propelling and steering; storage means for exothermically interacting bodies; means for conducting said bodies to the reaction spot; means for admixing with the products of said reaction a certain volume of fluid from the immersing medium; a turbine utilizing such admixture as working fluid, means for transmitting power developed by said turbine to said propelling means and means for heating a certain proportion of the working fluid by means of exhaust gases from said turbine.

In testimony whereof I affix my signature in presence of two witnesses.

SEBASTIAN ZIANI DE FERRANTI.

Witnesses:

WALTER ARTHUR EDGAR WOODMAN,
WILLIAM DUNCAN DAVIDSON.